Nov. 22, 1960 G. S. GOULD 2,960,828
FLUID PRESSURE POWER SYSTEM
Filed March 22, 1957 7 Sheets-Sheet 1

INVENTOR.
GARDNER S. GOULD
BY
Dike, Thompson & Sanborn
ATTORNEYS

FIG. 3

INVENTOR.
GARDNER S. GOULD
BY
Dike, Thompson & Sanborn
ATTORNEYS

Nov. 22, 1960

G. S. GOULD 2,960,828

FLUID PRESSURE POWER SYSTEM

Filed March 22, 1957

INVENTOR.
GARDNER S. GOULD
BY
*Dike, Thompson & Sanborn*
ATTORNEYS

FIG. 7

INVENTOR.
GARDNER S. GOULD
BY
Dike, Thompson + Sanborn
ATTORNEYS

Nov. 22, 1960   G. S. GOULD   2,960,828
FLUID PRESSURE POWER SYSTEM
Filed March 22, 1957   7 Sheets-Sheet 7

INVENTOR.
GARDNER S. GOULD
BY
Dike, Thompson + Sanborn
ATTORNEYS

United States Patent Office 2,960,828
Patented Nov. 22, 1960

2,960,828
FLUID PRESSURE POWER SYSTEM
Gardner S. Gould, Off Cross Road, Lunenburg, Mass.
Filed Mar. 22, 1957, Ser. No. 647,870
17 Claims. (Cl. 60—52)

This invention relates to a differential fluid pressure operated power system. The invention is particularly adaptable for use in machine tool applications for moving a tool relative to a workpiece at various rates and for rapidly and precisely changing the rates, as from a rapid advance down to an extremely slow rate of movement for feeding a tool into the work.

To obtain with hydraulic equipment a movement which goes from a rapid rate down to an extremely slow rate has usually required a complicated circuit of piping and valving. One of the reasons for this is that the practical manner of bleeding a very small quantity of fluid through a small orifice to produce a slow rate of movement may result in plugging of the opening even by a small piece of lint or other foreign matter. Another difficulty has been the problem of heat produced by the movement of oil in a complicated circuit and through small orifices and in the variation in the rate of flow due to the change in viscosity of oil as its temperature rises, resulting in difficulties in controlling the rate of feed. The usual system of valves and pipes is conducive to leakage which also affects the rate of movement, and since fluid has to be drained back to a fluid supply tank, the piping complication and cost is increased.

It is an object of the present invention to produce a simple hydraulic power system with a minimum of valves and connections, which in fact eliminates the use of valves outside of the pumps and the fluid motor, and which overcomes the above stated disadvantages, and which at the same time is capable of producing a motion in either direction which is variable from a rapid rate down to a very slow precisely controlled minimum rate of movement.

Essentially the mechanism of the invention comprises a reversible fluid pressure operated motor and a pair of reversible variable volume pumps connected in a closed circuit in parallel with each other and with the fluid motor. When the pumps are operated at full capacity in the same direction the maximum motion is produced in that direction. When one of the pumps is operated in one direction and the other pump is operated in the opposite and at a rate which is slightly less than the rate of operation of the first pump, for instance, by a differential of one minim, the motor is caused to operate in the direction of flow produced by the first motor at the rate of one minim. Since the pumps are constructed for reversibility and variability of the rate of flow by adjustability of the relative positions of the component pump parts, a simple closed circuit hydraulic connection may be used between the pumps and the motors without valves and associated piping and mechanism.

The invention will be more clearly understood from the following description and associated drawings in which.

Figures 1, 2:
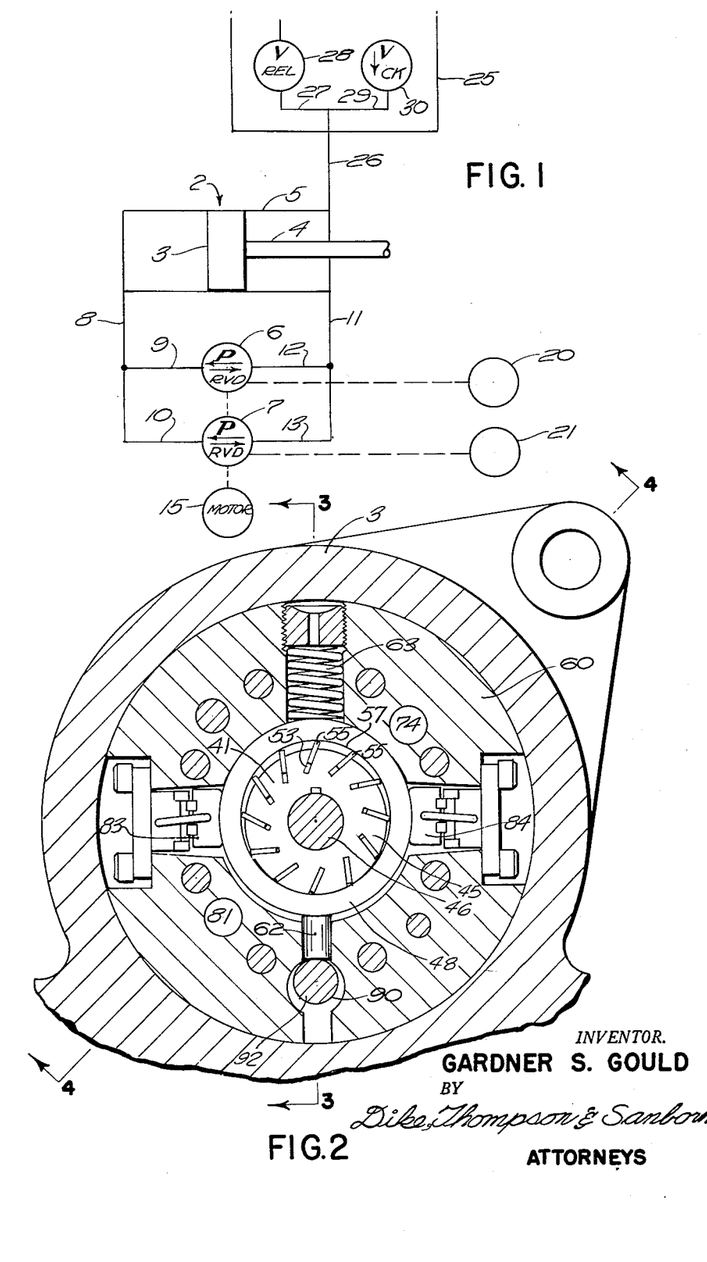
Fig. 1 is a schematic view of a differential fluid pressure power system according to the invention.
Fig. 2 is a transverse section taken along the lines 2—2 of Fig. 3.

The basic embodiment of a differential fluid power system according to the invention is seen in Fig. 1, comprising a fluid operated motor 2 including a piston 3 having a piston rod 4 operating in a cylinder 5, a pair of reversible variable delivery fluid pumps 6 and 7, and means including the fluid conduits 8 to 13 inclusive connecting the pumps 6 and 7 in parallel with the fluid motor 2, a drive motor 15 connected to operate both pumps 6 and 7, a control mechanism 20 to vary the rate and direction of delivery of the pump 6 and a corresponding control mechanism 21 for the pump 7 for the same purpose.

A gravity fluid tank 25 has leading from it a fluid conduit 26 to the right-hand end of the cylinder 5 which contains the piston rod 4. In the tank 25 one branch 27 of the line 26 has a constant pressure relief valve 28 for maintaining pressure at a predetermined value in the line 26 and for allowing fluid to escape from the line 26 into the tank 25 when the pressure in the line goes above the predetermined value. Another branch line 29 has a check valve 30 to allow fluid from the tank 25 to be drawn into the line 26 but preventing its escape therefrom in the other direction.

Thus there is a closed circuit between the pumps 6 and 7 and the ends of the cylinder 5 on opposite sides of the piston 3.

In operation when both of the pumps 6 and 7 are delivering at full capacity to the right into the lines 11, 12 and 13 the piston 3 moves to the left at its most rapid rate. Conversely when both pumps 6 and 7 deliver at full capacity to the left through the lines 8, 9, and 10 the piston 3 moves to the right most rapidly. If the pump 6 is adjusted by its control mechanism 20 to pump at full capacity to the right into the line 11 and the control mechanism 21 is adjusted to cause the pump 7 to be reversed and to deliver to the left into the line 8 at a rate of delivery which is less than the delivery of the pump 6 to the right, for instance, by one minim the piston 3 moves to the left very slowly, at a rate determined by delivery of fluid in the line 11 at the rate of one minim. As the pump 6 delivers to the right at full capacity, the pump 7 is pumping to the left and taking all of the fluid delivered by the pump 6 except the differential of one minim in the rates. Thus a differential of fluid is delivered to the right-hand side of the cylinder 5 through the line 11 and fluid is exhausted from the left-hand side of the cylinder 5 through the line 8 by the pump 6 at the same rate, which is the difference between what the pump 6 is delivering and what it is taking through the lines 9 and 10 from the pump 7. Conversely the control mechanisms 20 and 21 may be adjusted for delivery of a predetermined differential of oil from the pumps 6 and 7 to the left-hand end of the cylinder 5 through the line 8 for movement of the piston 3 to the right, with fluid exhausting from the right-hand end of the cylinder 5 through the line 11.

It will be seen that because there is a piston rod 14 on only one side of the piston 3, the right-hand end of the cylinder 5 will carry less volume of oil than the left-hand end because the piston rod 4 occupies some of the space. In this case the provision for the difference in volume is made by the fluid tank 25. When the piston 3 is being moved to the right the pumps 6 and 7 are trying to fill the cylinder on the left-hand end. There is not enough oil exhausting from the right-hand end of the cylinder 5 so the pumps 6 and 7 draw some oil from the tank 25 through the check valve 30. This has the additional advantage that the circuit is thus always kept full of oil when the circuit might otherwise lose some through leakage.

When the piston 3 is being moved to the left the right-hand end of the cylinder 5 cannot receive all of the oil exhausted from the left-hand side. Therefore, the pumps 6 and 7 force the surplus oil into the tank 25 through the pressure relief valve 28. The valve 28 is set at a predetermined pressure which is sufficient to move the load carried by the piston 3.

In the case of an arrangement where both ends of the cylinder 5 have an equal volume capacity as where the piston rod is extended also through the left-hand end of the cylinder the accumulation tank 25 and valves may not be needed. In the latter case it will be seen that the oil exhausted from one end of the cylinder 5 is pumped into the other end at the predetermined adjusted rate and that the excess oil is recirculated through the pumps 6 and 7 and associated lines 8 to 13 by which they are connected in parallel. Thus the system may form its own reservoir.

Figs. 2 to 6 inclusive illustrate an embodiment of the invention in which the entire system is self-contained within the cylinder of the fluid operated motor.

Figure 3:
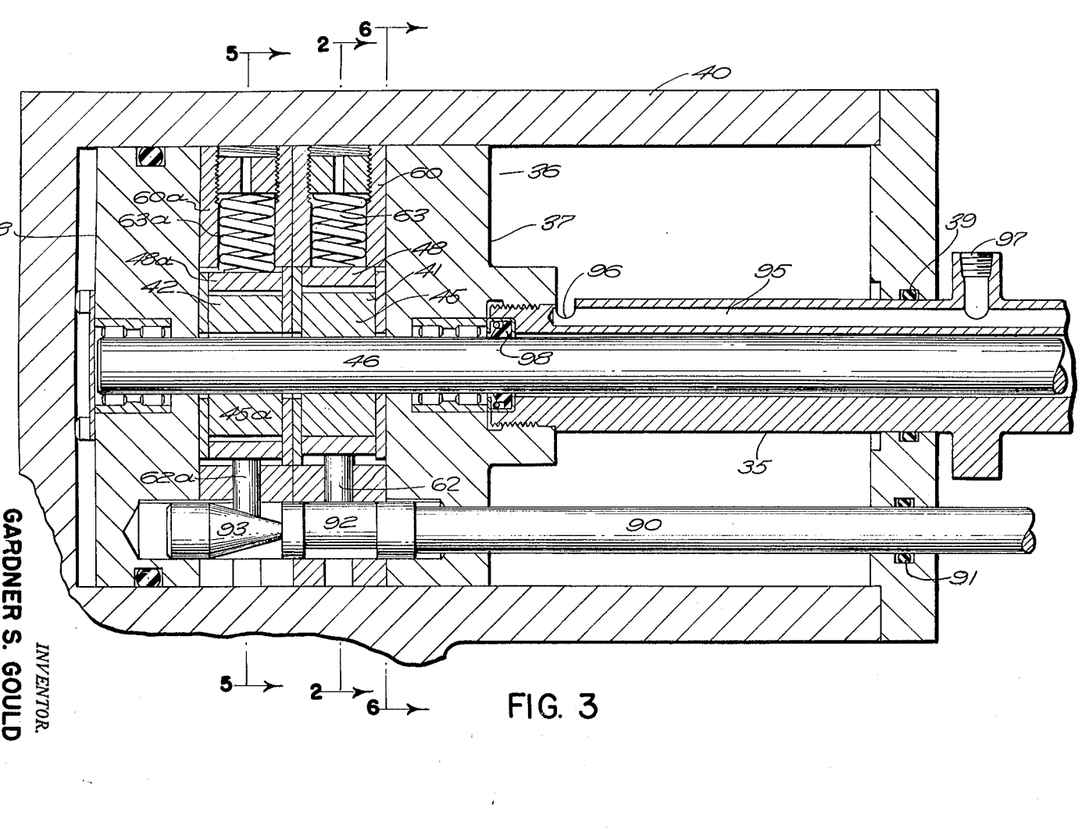
Fig. 3 is a longitudinal view partly in section and taken along the lines 3—3 of Fig. 2 of an embodiment of a self-contained system constructed according to the invention.

Referring first to Fig. 3, a hollow piston rod 35 may be rigidly supported by means (not shown) to provide the support for the unit. The piston rod 35 carries a piston 36 having end walls 37 and 38. Slidably mounted on and surrounding the piston 36 and part of the rod 35 is a cylinder 40, which being movable to the left and right relative to the rigidly mounted piston rod 35 and piston 36 may by a suitable attachment to a bolt hole 43 in a boss 44 carry the load to be moved.

Mounted axially of the piston rod 35 and piston 36 and between the walls 37 and 38 are a pair of eccentric casing vane type reversible variable delivery fluid pumps 41 and 42.

Referring now also to Figs. 2 and 4 to 6, the two pumps 41 and 42 are substantially the same. Each pump 41, 42 has a rotor 45, 45a keyed to a shaft 46 rotatably journalled inside of the piston rod 35 and piston 36 and connected to be operated by power means (not shown) outside of the cylinder 40.

Figure 5:
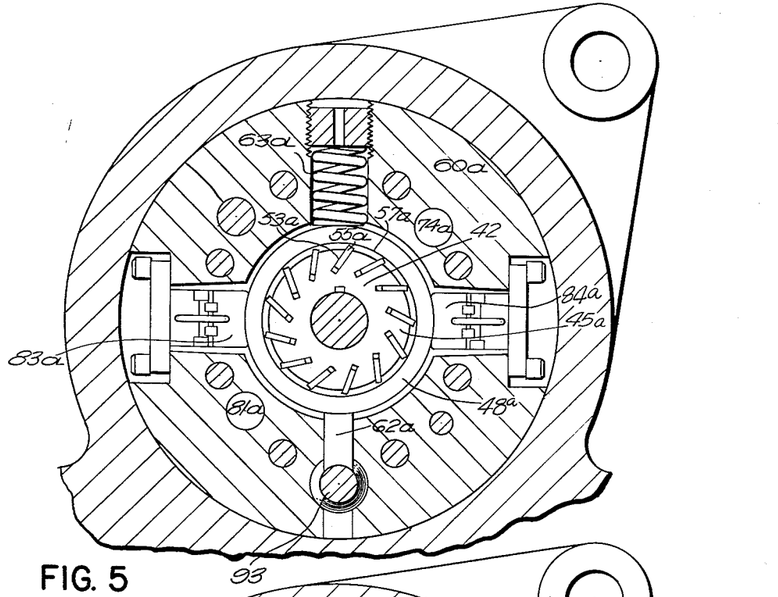
Fig. 5 is a transverse section taken along the lines 5—5 of Fig. 3.

As best seen in Figs. 2 and 5 each rotor 45, 45a is surrounded by an annular casing 48, 48a and enclosed at the ends by end plates 50 and 51 and 50a and 51a respectively. Slidably in grooves 53, 53a surrounding the peripheries of the rotors 45 and 45a are vanes 55, 55a which are urged outwardly by centrifugal force against the inner surfaces 57, 57a of the annular casings 48 and 48a. The annular casings 48 and 48a are loosely surrounded by and carried in housings 60 and 60a respectively, so that as viewed in Figs. 2, 3 and 5 the casings 48, 48a may be moved up and down relative to the axis of the shaft 46 while in all relative positions caused by said movements the vanes 55, 55a are rotated by the rotors 45 and 45a with their outer edges in constant engagement with the inner surfaces 57, 57a of the casings 48, 48a. The pumps 41, 42 have plungers 62, 62a each in contact with the bottom of a respective casing 48, 48a whereby upward movement of the plungers 62, 62a causes upward movement of the casings 48, 48a. The casings 48, 48a are urged downwardly against their plungers by springs 63, 63a carried in the housings 60, 60a.

Figure 6:
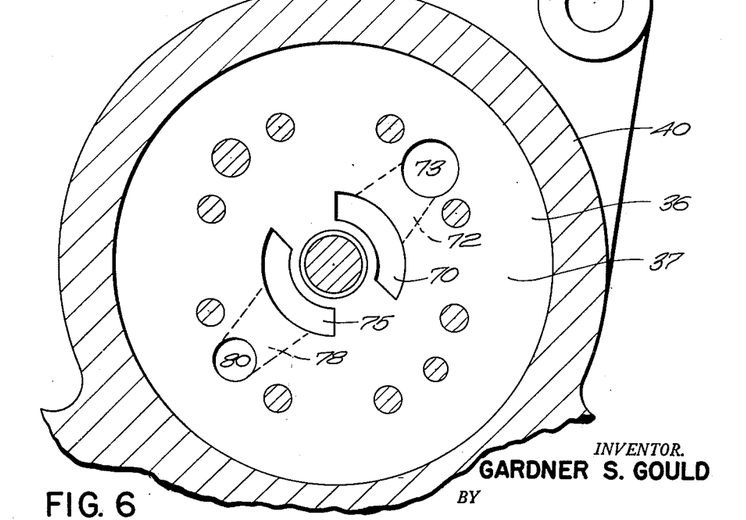
Fig. 6 is a transverse section taken along the lines 6—6 of Fig. 3.

As seen in Figs. 2, 5 and 6 the rotors 45, 45a and vanes 55, 55a are driven in a counterclockwise direction by the shaft 46.

Figure 4:
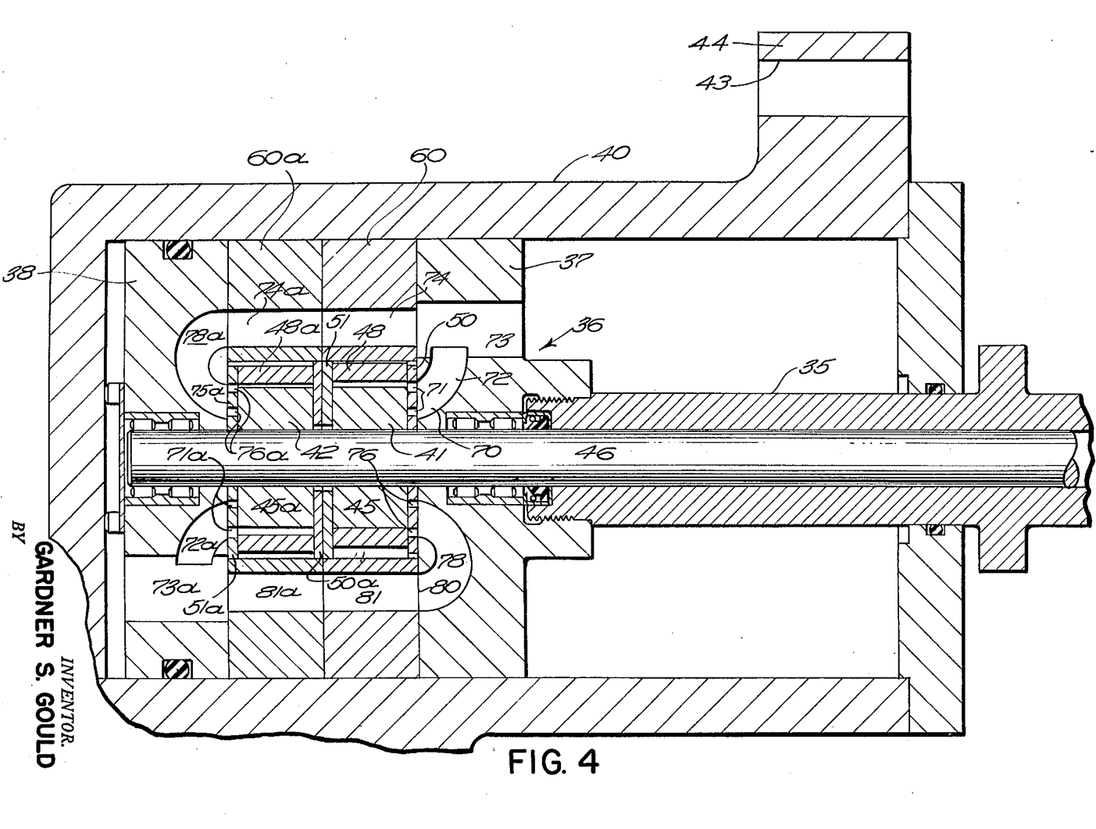
Fig. 4 is a view similar to Fig. 3 taken in an axial plane which has been rotated 45° from the plane of Fig. 3 and taken along the lines 4—4 of Fig. 2.

Now referring to Figs. 4 and 6, the end wall 37 of the piston 36 has an arcuate port 70 which leads through perforations 71 in the end plate 50 to the interior of the pump 41 inside the casing 48 and in the other direction upwardly and to the right as seen in Fig. 4 through a passage or port 72 to a port or passage 73. The passage 73 leads to the right-hand end of the cylinder 40 and to the left into a port 74 in the housing 60 which in turn is connected to a port 74a in the housing 60a. The end wall 37 also has an arcuate port 75 leading to perforations 76 in the plate 50 inside the casing 48. The arcuate passage 78 leads from the perforations 76 to a port 81 in the housing 60 which in turn leads through a port 81a in the housing 60a, thence to a passage 73a in the end plate 38 opening to the left-hand end of the cylinder 40. Corresponding ports 75a, 76a, 78a in the motor 42 connect with the passage 74a leading as described to the right-hand end of the cylinder. Corresponding ports 71a, 72a, connect the inside of the casing 48a of the motor 42 with the passage 73a and the left-hand side of the cylinder 40.

Referring now to Figs. 2, 3, 4 and 6, the operation of the pump 41 is such that when the rotor 45 is rotated counterclockwise as seen in Fig. 2 with the casing 48 in the upward position as shown fluid is drawn from the ports 70, 72, 73 into the pump 41 between the rotor 45 and the casing 48 and carried to the left over the top of the rotor 45 and then downwardly and out through the ports 75, 78, 80. When the casing 48 is allowed to be lowered with its center below the axis of the rotor 45 the delivery of the pump 41 is in the opposite direction, fluid being drawn from the ports 75, 78, 80, down around the bottom of the rotor 45 and out through the ports 70, 72 and 73. When the casing 48 is concentric with the rotor 45 no oil is moved through the pump. The flow may be varied in either direction by movement of the casing from the neutral concentric position.

The upward position of the casing 48a will cause the pump 42 to draw fluid from the passage 74a and the port 75a and to force it out through the ports 71a, 72a and the passage 73a. Downward movement of the casing 48a causes a reversal of flow, and the flow may be varied in either direction by movement from a neutral concentric position of the casing 48a.

The casing 48 is centered vertically by a pair of resilient shoes 83 and 84 and there are corresponding shoes 83a and 84a to center the casing 48a in the motor 42.

It is thus seen that the pumps 41 and 42 are arranged so as to be able to deliver oil together to the right-hand side of the cylinder 40 through the passage 73 exhausting oil from the left-hand cylinder 40 through the passage 73a to move the cylinder 40 rapidly to the right relative to the piston 36, or to work together to deliver fluid through the passage 73a to the left end of the cylinder 40 and to take it from the right end of the cylinder 40 through the passage 73, or to deliver fluid to and from each other in either direction with the resultant delivery of fluid in either direction through the passages 73 and 73a to and from the left and right-hand ends of the cylinder 40 at a rate determined by the differential and the adjusted rates of delivery of the two pumps 41 and 42.

As best seen in Fig. 3, the plungers 62 and 62a for moving the casings 48 and 48a against the springs 63 and 63a are operated selectively together or independently of each other by a reach rod 90 which extends slidably and rotatably within the piston 36 through a fluid tight opening 91 in one end of the cylinder 40. The reach rod 90 has an eccentric portion 92 in contact with the plunger 62 of the pump 41 and a conical portion 93 in contact with the plunger 62a of the pump 42. Therefore axial movement of the reach rod 90 relative to the piston 36 causes up and down movement of the plunger 62a and the casing 48a to vary the direction and rate of delivery of the pump 42 without disturbing the position of the plunger 62 and the casing 48 in the pump 41. Rotative movement without axial movement of the reach rod 90 moves the plunger 62 and the casing 48 of the pump 41 up and down to vary the direction and rate of its delivery without disturbing the pump 42. A combined relative axial and rotative movement of the rod 90 will adjust both pumps simultaneously as desired either to make them work together or against each other.

Referring to Fig. 3 an offset passage 95 is provided in the piston rod 35 opening at a port 96 into the right-hand end of the cylinder 40 and having a connection port 97 to which a suitable fluid feed line may be made up for filling and replenishing the system. When filled the port 97 may be plugged.

It is thus seen that the mechanism of Figs. 2 to 6 inclusive is self-contained within the cylinder 40, that the cylinder 40 provides its own reservoir, and that the fluid is conducted by ports or passages within the self-contained parts thus eliminating the need for fluid piping and conduits outside the cylinder 40 except for filling the system. Packing 39 prevents leakage around the piston rod 35 and similar packing 91 surrounds the reach rod 90. A packing 98 between the rotatable shaft 46 and the piston rod 35 prevents leakage along the shaft 46.

Another embodiment illustrated in Figs. 7–10 inclusive is arranged to function as a horizontal drill head, and is mounted on a base structure B.

Figure 7:
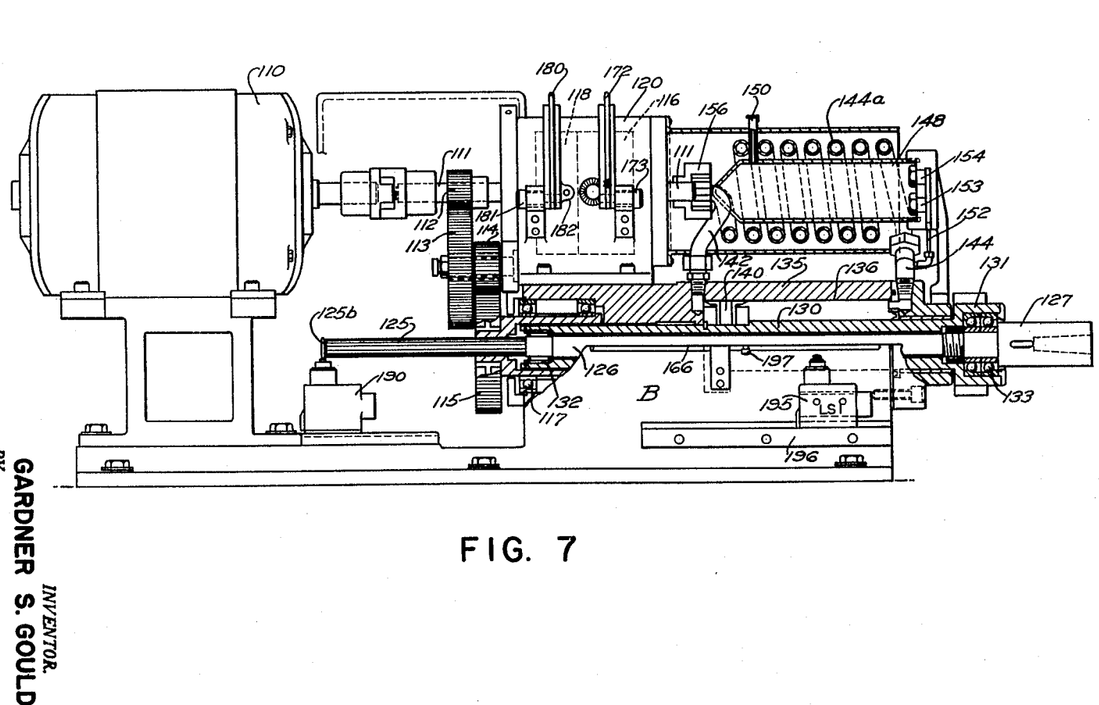
Fig. 7 is a longitudinal elevation partly in section showing a modification of the invention.

As seen in Fig. 7 an electric motor 110 is coupled to a shaft 111 and arranged to drive a train of gears 112, 113, 114 and 115 and also a pair of variable delivery fluid pumps indicated at 116 and 118 which are mounted on the shaft 111 in a casing 120 and which are identical in structure and operation with the pumps 41 and 42 in Fig. 3.

The gear 115 is mounted in a bearing 117 and is rotatively fast too but axially slidable on a splined portion 125 of a shaft 126 on the right-hand end of which is a drill chuck 127. The shaft 126 is mounted inside of a hollow piston rod 130 having an enlarged right-hand end 131 and is axially fixed and at the same time rotatable relative to it, being journalled in suitable bearings 132 and 133 at opposite ends of the piston rod 130. The piston rod 130 is axially movable left and right in a cylinder 135 an enlarged portion of which 136 contains a piston 140 fixed to the piston rod 130. A fluid line 142 leads from the pump casing 120 to the left-hand end of the cylinder portion 136 and corresponds to the fluid passage 73a in Fig. 4 and to the fluid line 8 in Fig. 1 and a fluid line 144 leads from the pump casing 120 to the right-hand end of the cylinder portion 136 and corresponds to the fluid passage 73 in Fig. 4 and to the fluid line 11 in Fig. 1.

Thus while the electric motor 110 is turning the shaft 111 the drill chuck 127 is being rotated through the gear train 112 to 115 and fluid may be pumped through the line 142 into the cylinder 136 and exhausted through the fluid line 144 to move the piston 140, the piston rod 130, the shaft 126 and the drill chuck 127 to the right. Reversal of the flow of fluid in the lines 142 and 144 brings the drill chuck 127 back to the left.

The fluid line 144 is arranged in the form of a cylindrical coil 144a between the pump casing 120 and the cylinder 136 for the purpose of cooling the fluid passing through it. Surrounding the coil 144a is a perforated cylindrical shell 146, and mounted within the coil 144a is a cylindrical fluid reservoir 148 having a filler opening 150 and corresponding to the fluid reservoir 25 in Fig. 1. The reservoir 148 leads to the fluid line 144 through a fluid line 152, corresponding to the fluid line 26 in Fig. 1, by way of a check valve 153 corresponding to the check valve 30 in Fig. 1 and a pressure relief valve 154 corresponding to the pressure relief valve 28 in Fig. 1. The reservoir 148 and associated parts serve the same function as the reservoir 25 as described in connection with Fig. 1. An air fan 156 is mounted on the right-hand end of the shaft 111 and is rotated thereby to circulate air around the coil 144a and reservoir 148 through the perforations 147 in the shell 146 and out of its right-hand open end.

Figure 8:
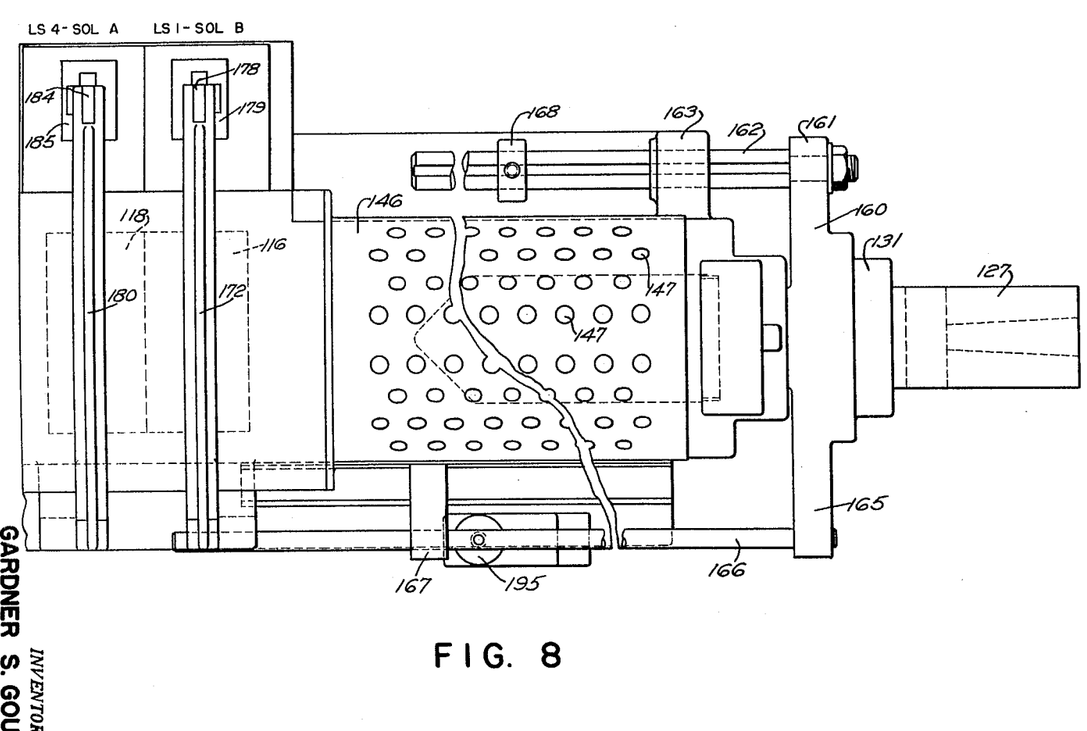
Fig. 8 is a top plan view of the machine shown in Fig. 7.
Figure 9:
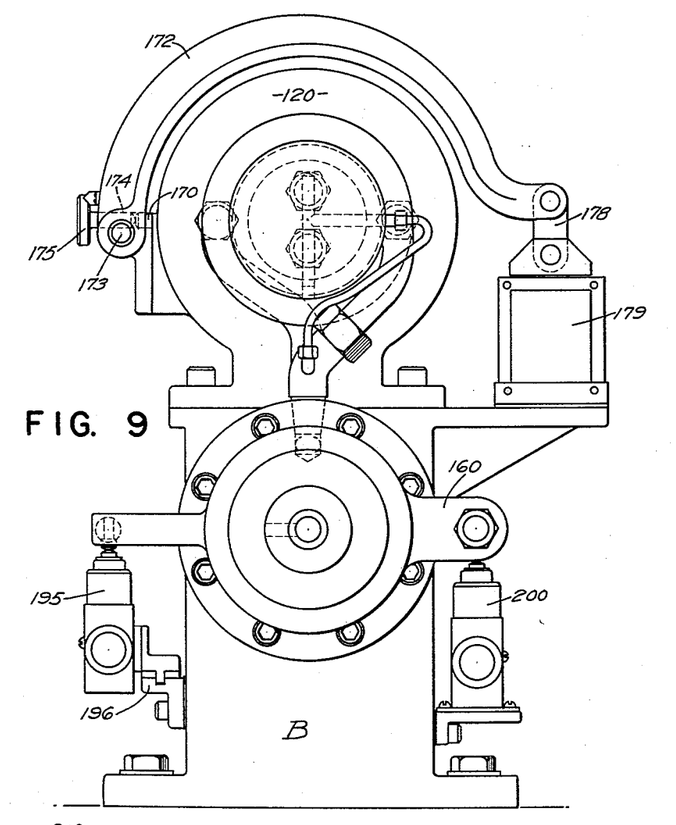
Fig. 9 is an end elevation view of the machine shown in Fig. 7.

The right hand enlarged end 131 of the piston rod 130 has a cross head 160 as seen in Figs. 8 and 9, to a back portion 161 of which is attached a rod 162 which is slidable in a boss 163 attached to the base B and to a front portion 165 of which is attached a rod 166 also slidable in a boss 167 attached to the base B for providing rigidity to the drill chuck 127 particularly in its extended position. A stop collar 168 is adjustably mounted on the rod 162 to abut against the boss 163 to limit extended motion to the right.

Referring to Fig. 9 a plunger 170 corresponding to the plunger 62 in Fig. 3 and operating in the same manner, controls the flow of fluid from the pump 116. A similar plunger (not shown) corresponding to the plunger 62a in Fig. 3 and operating in the same manner controls the flow of fluid from the pump 118. An arm 172 pivoted at 173 has an adjustable screw 174 operated by a knurled nut 175 which abuts against the plunger 170 to move the latter to the right when the arm 172 is moved downwardly by the plunger 178 of a solenoid 179 when the latter is energized. Since operation of the solenoid 179 always moves the arm 172 down to the same position, the movement of the plunger 170 may be adjusted by turning the nut 175. And since the leverage of the arm 172 is great, the movement of the screw 175 is small and its adjustment provides a precise and accurate movement of the plunger 170 to control its pump. The pump 118 is controlled by an arm 180 pivoted at 181 having a fixed cam surface supported in a boss 182 seen in Fig. 7, to operate the plunger of the pump 118. The arm 180 is operated by the plunger 184 of a solenoid 185 for downward movement when the solenoid 185 is energized.

Figure 10:
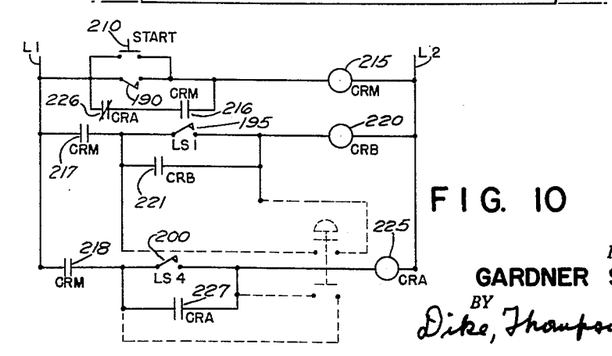
Fig. 10 is a wiring diagram for the control system in the machine shown in Figs. 7–9.

A switch 190, Figs. 7 and 10 is held open by the rearward or left-hand end 125b of the drill shaft 125 when the latter is in retracted or left-hand position as seen in Fig. 7 and is otherwise closed when the drill chuck 127 is extended to the right. A switch 195, Figs. 7, 9 and 10 is adjustably positioned in a slideway 196 in front of the base B so as to be momentarily closed at the end of a rapid traverse motion of the drill shaft 125 to the right, by a contact member 197 carried by the rod 166. Another switch 200 (Fig. 9) is arranged to be momentarily closed by a suitable contact member (not shown) carried by and under the stop collar 168 when the drill shaft 125 and drill chuck 127 reach their extended position to the right at the end of the feed motion. A start switch 210 is indicated on the control diagram, Fig. 10, and is closed to start the cycle of operation. Since the drill shaft 125 is retracted, the switch 190 is held open.

Referring to Fig. 10 closure of the start switch 210 completes a circuit between power lines L1 and L2 through a control relay 215 for the motor which energizes the relay 215, which by a suitable circuit and switch mechanism (not shown) starts the electric motor 110. When the control relay 215 is thus energized, it also closes control relay switches 216, 217 and 218. Closure of the relay switch 216 completes a circuit through a normally closed relay switch 226 to form a holding circuit for the motor control relay 215. Until the piston 140 and drill shaft 125 start to move towards the right, switch 190 is held open. At this point the solenoids 179 and 185 are open and de-energized allowing the pump control arms 172 and 180 to remain up. In this condition, the pumps 116 and 118 are both pumping fluid at maximum capacity through the fluid line 142 to move the piston 140 and drill chuck 127 to the right at a maximum rate of traverse, to cause the drill to approach the work, at the same time exhausting fluid through the line 144 from the cylinder 136.

When the contact member 197 strikes the switch 195, the shaft 125 and drill chuck 127 slow down to a predetermined rate of feed, which is brought about by energizing the solenoid 179 to move the control arm 172 downwardly which reverses the pump 116. The rate of movement of the drill chuck 127 to the right is now determined by the differential between the pump 118 pumping in one direction and the other pump 116 pumping in the opposite direction, the resultant flow of fluid continuing to enter the cylinder 136 through the fluid line 142. Closure of the switch 195 completes a circuit between the power lines I1 and L2 through the now closed relay switch 217 and a control relay 220 which when energized, actuates the solenoid 179 through a suitable circuit and switch mechanism (not shown), and also closes a control relay switch 221 thus forming a holding circuit through the control relay 220 to keep the solenoid 179 energized. When the drill shaft 125 and drill chuck 127 reach the end of the feed motion to the right, the switch 200 is momentarily closed by the contact element on the stop collar 168 which results in reversal of the pump 118 causing a rapid retraction of the drill shaft 125 and drill chuck 127 to the left as viewed in Fig. 7. Closure of the switch 200 completes a circuit between the power lines L1 and L2 through the now closed control relay switch 218 and a control relay 225 which when energized, actuates the solenoid 185 to lower the control arm 180 reversing the pump 118 as previously described, also opening the control relay switch 226 and closing a control relay switch 227. Closure of the switch 227 provides a holding circuit for the control relay 225 keeping the solenoid 185 energized during retraction.

When the drill shaft 125 is fully retracted, its lefthand end 125b now opens the switch 190. The control relay switch 226 having previously been opened by actuation of the relay 225, the holding circuit through the motor control relay 215 is now broken and the motor is stopped. The solenoids 179 and 185 are now also deactivated because their control relays 220 and 225 are de-energized by the opening of the control relay switches 217 and 218 which are controlled by the motor control relay 215. When the control relays 215, 220 and 225 are de-energized, the control relay switch 226 is closed and the control relay switches 216, 221 and 227 are also opened. The system is now ready to start a new cycle by closure of the starting switch 210.

It is seen that additional limit switches and control relay switches may be added to provide a "jump feed" feature, that is a cycle comprising a series of alternate rapid traverses and slower feed motions while the drill chuck 127 is moving to the right. Alternatively, the feed cycle may be repeated without repeating the rapid traverse in either direction, as for instance, where it is desirable to clean the drill hole of chips. Additional control features may be incorporated, for instance, as by provision of means for reversing the drive motor and pumps 116 and 118, thereby causing reversal of flow.

I have thus provided a simplified highly efficient fluid pressure operated system capable of precise control over a range from a rapid to a very slow minute rate of motion. The temperature of the fluid tends to remain consistent throughout the system and therefore a variation in temperature and therefore viscosity does not affect its operation. Since no small orifices are involved and the minute adjustments in rates are obtainable by small differentials in large volumes of oil less heat is generated in the fluid.

The many advantages and uses to which the invention may be put will now be apparent to those skilled in the art.

I claim:
1. A differential fluid pressure power system comprising in combination a fluid operated motor, a pair of fluid pumps, means connecting output sides of said pumps in parallel with an input side of said motor, power means to operate said pumps, and control means to change the volume and the direction of flow of each of said pumps relative to that of the other.

2. A differential fluid pressure power system comprising in combination a reversible fluid operated motor, a pair of reversible fluid pumps, means connecting said pumps in parallel with said motor, power means to operate said pumps, and control means to change the volume and direction of delivery of each of said pumps relative to the other.

3. A differential fluid pressure power system comprising in combination a reversible fluid operated motor, a pair of reversible variable delivery fluid pumps, means connecting said pumps in parallel with said motor, power means to operate said pumps, and control means to vary the rate and direction of delivery of each of said pumps relative to the other.

4. A differential fluid pressure power system according to claim 3 in which said means connecting said pumps to said motor form a closed circuit.

5. A differential fluid pressure power system according to claim 3 in which the said fluid pumps are of the positive displacement type.

6. A differential fluid pressure power system according to claim 3 in which the said motor is a piston operating in a cylinder.

7. A differential fluid pressure power system according to claim 6, including a fluid tank, a fluid line from the tank connected to one side of said cylinder, a check valve in said line allowing withdrawal of fluid from the tank to the cylinder and a pressure valve in said line preventing return of fluid from the cylinder to the tank except under elevated pressure.

8. A differential fluid pressure power system comprising in combination a cylinder, a piston movable axially relative to the cylinder, a pair of reversible variable delivery pumps mounted within the piston, said piston having ports connecting said pumps in parallel with both ends of the cylinder, power means to operate said pumps and control means to vary the rate and direction of delivery of one of said pumps relative to the other.

9. A differential fluid pressure power system comprising in combination a cylinder, a piston and piston rod movable axially relative to the cylinder, a pair of reversible variable delivery fluid pumps mounted within the piston, said pumps having a common drive shaft rotatable on the axis of said piston rod, power means outside said cylinder to rotate said drive shaft, said piston having ports connecting said pumps in parallel with both ends of the cylinder, and control means to vary the rate and direction of delivery of one of said pumps relative to the other.

10. A differential fluid pressure power system according to claim 9 in which said control means comprises a reach rod extending from said piston through one end of said cylinder, and means connecting said rod to said pumps whereby rotation of said rod controls one said pump and axial movement of said rod controls the other said pump.

11. A differential fluid pressure power system comprising in combination a piston having a hollow piston rod, means rigidly to support said rod, a cylinder slidably enclosing said piston and part of said rod and movable axially relative to said piston and rod, a pair of eccentric casing vane type reversible variable delivery fluid pumps mounted side by side within said piston, a rotatable shaft extending through said piston rod, the rotors of said pumps being mounted on said shaft, plunger means in said pistons movable radially of said shaft and operating independently to vary the eccentricity of the casings of said pumps thereby to vary the direction and rate of delivery of one said pump relative to the other, power means to rotate said shaft, said piston having ports connecting said pumps in parallel with both sides of the cylinder, a reach rod extending from within said piston relatively slidably through one end of said cylinder, said reach rod having an eccentric portion in contact with the plunger means of one said pump and a conical portion in contact with the plunger means of the other said pump whereby rotation and axial movement of said reach rod controls one of said pumps independently of the other.

12. A differential fluid pressure power system comprising in combination a reversible fluid operated motor, a plurality of reversible variable delivery fluid pumps having control mechanisms operable to vary the direction of the delivery of said pumps, means connecting said pumps in parallel in a closed circuit with each other and with said motor, power means simultaneously to operate said pumps, and means independently to operate said control mechanisms thereby to produce a predetermined fluid flow from said pumps to said motor to operate said motor in either direction.

13. A feed and drive mechanism comprising a rotatable shaft, power means to rotate the shaft, a fluid operated motor connected to move said shaft axially, a pair of fluid pumps operable alternatively at cumulative and differential capacities, conduit means connecting said pumps in parallel with said motor, means operable independently to reverse said pumps, and control means operating in timed sequential relation in a continuous cycle to reverse said pumps, thereby to produce rapid, slow and reverse axial movement of said shaft.

14. A feed and drive mechanism comprising a rotatable shaft, power means to rotate the shaft, a cylinder, a piston in the cylinder connected to move the shaft axially, a pair of fluid pumps operable alternatively at cumulative and differential capacities, conduit means connecting the pumps in parallel with the cylinder, means operable independently to reverse the pumps, and control means operating in timed sequential relation in a continuous cycle to reverse said pumps, thereby to produce rapid, slow and reverse axial movement of said shaft.

15. A feed and drive mechanism comprising a rotatable shaft, power means including a gear to rotate the shaft, the shaft being axially slidable relative to the gear, a cylinder, a piston in the cylinder connected to move the shaft axially, a pair of fluid pumps operable by said power means alternatively at cumulative and differential capacities, conduit means connecting the pumps in parallel with the cylinder, means including a pair of solenoids operable independently to reverse the pumps, and electro-responsive control means operating in timed sequential relation in a continuous cycle to actuate said solenoids, thereby to produce rapid, slow and reverse axial movement of said shaft.

16. A feed and drive mechanism comprising a rotatable shaft, power means to rotate the shaft, a fluid operated motor connected to move said shaft axially, a pair of fluid pumps operable alternatively at cumulative and differential capacities, conduit means connecting said pumps in parallel with said motor, means operable independently to reverse said pumps, and electro-responsive means including limit switches operated sequentially to control said power means and said pump reversing means, thereby to produce rapid, slow and reverse axial movement of said shaft.

17. A differential fluid pressure system containing in combination, a pair of reversible fluid pumps having possible variable different output capacities, power means to operate said pumps, and means connecting the output and input sides of said pumps interchangeably to make the total output at any given time the sum of the outputs of the two pumps or that of one pump subtracted from that of the other.

References Cited in the file of this patent

UNITED STATES PATENTS

| | | |
|---|---|---|
| 1,575,519 | Amsler | Mar. 2, 1926 |
| 1,896,052 | Ferris | Jan. 31, 1933 |
| 2,042,247 | Blood | May 26, 1936 |
| 2,160,217 | Kingsbury | May 30, 1939 |
| 2,172,900 | Benedek | Sept. 12, 1939 |
| 2,274,734 | Esnault-Pelterie | Mar. 3, 1942 |
| 2,328,258 | Cannon | Aug. 31, 1943 |
| 2,353,388 | Cannon | July 31, 1944 |
| 2,535,550 | Price | Dec. 26, 1950 |
| 2,582,556 | Morey | Jan. 15, 1952 |
| 2,755,626 | Himmler | July 24, 1956 |
| 2,799,138 | Dornhofer | July 16, 1957 |
| 2,820,342 | Heintz | Jan. 21, 1958 |